H. WILLIAMS.
FILTER AND PROCESS FOR CLEANING THE SAME.
No. 176,571. Patented April 25, 1876.
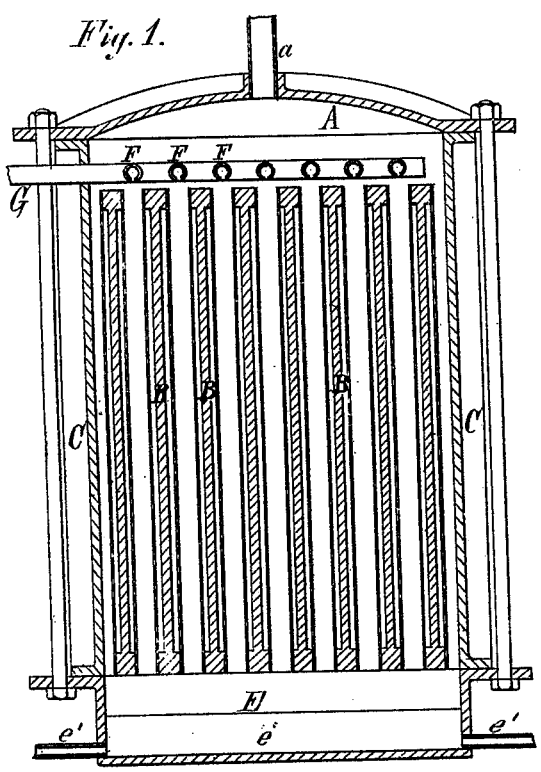
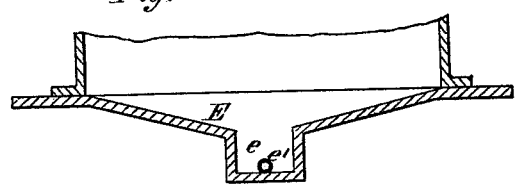
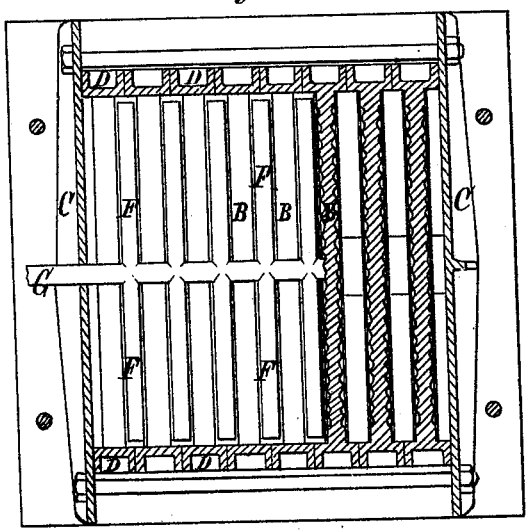
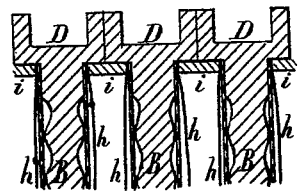
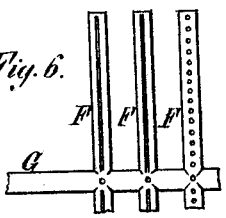
Witnesses: Edward Wilhelm, Chas. J. Buchheit
Horace Williams, Inventor
by Jay Hyatt, Atty

UNITED STATES PATENT OFFICE.

HORACE WILLIAMS, OF BUFFALO, NEW YORK, ASSIGNOR TO WILLIAM HAMLIN, OF SAME PLACE.

IMPROVEMENT IN FILTERS AND PROCESSES FOR CLEANING THE SAME.

Specification forming part of Letters Patent No. 176,571, dated April 25, 1876; application filed January 3, 1876.

*To all whom it may concern:*

Be it known that I, HORACE WILLIAMS, of the city of Buffalo, in the county of Erie and State of New York, have invented certain Improvements in Filters, which improvements are fully set forth in the following specification, reference being had to the accompanying drawing.

My invention relates to that class of filters which are used for filtering saccharine solutions, the filter being so constructed that the filtrate is discharged continuously, while the solid matter accumulating on the filtering-surfaces is discharged intermittently.

Previous to my invention filters of this kind had to be taken apart in order to effectually detach the solid matter from the filtering-surfaces, as the reciprocating and other scrapers sometimes employed in filters of this kind have been found not to accomplish the desired end.

The operation of taking the filter apart, cleaning the filtering-surfaces, and then putting the parts together, is not only laborious, but also consumes a great deal of time, during which the filter is unfit for use.

The object of my invention is to overcome this difficulty; and it consists, first, in the combination, with a filter provided with vertical filtering-partitions, of a series of water-pipes arranged above the same, and constructed with openings or perforations, so that streams of water can be directed upon the filtering-surfaces, whereby the impurities accumulated thereon are detached therefrom and removed from the filter, as will be hereinafter more fully described; second, in the combination, with the filtering-partitions, of an endless filtering cloth or apron and intermediate strips or bars for clamping the edges of the filtering-cloth, so as to form a tight joint, as will be hereinafter more fully described.

In the accompanying drawing, Figure 1 is a sectional elevation of a filter provided with my improvements. Fig. 2 is a horizontal section thereof. Fig. 3 is a detached sectional view of one of the filtering-partitions. Fig. 4 is a sectional view of the bottom of the filter at right angles to Fig. 1. Fig. 5 is a fragmentary horizontal section of a number of the filtering-partitions on an enlarged scale. Fig. 6 is a fragmentary bottom-plan view of the water-pipes.

Like letters of reference refer to like parts in each of the figures.

A represents the top plate or upper head of the filter, provided with a pipe, *a*, through which the saccharine solution to be filtered is admitted. B are the vertical filtering-partitions, composed of a grooved or corrugated body covered with wire-cloth, as shown in the drawings, or constructed in any other common and well-known manner. As shown in the drawing, the side walls of the filter-case are composed of two opposite plates, C C, while the other two walls are composed of sections D D, cast with or forming part of the vertical partitions B. E represents the bottom or lower head of the filter, formed by two inwardly-inclined plates, connected with a trough or channel, *e*, at the ends of which are arranged discharge-pipes *e'*, through which the impurities escape. F represents a number of horizontal water-pipes arranged at a suitable height above the spaces between the filtering partitions, so as not to interfere with the influx of the saccharine solution into said spaces. The pipes F are constructed on their under side with longitudinal slots or rows of fine perforations, as represented in Fig. 6, so as to eject a stream or sheet of water upon the two adjacent filtering-surfaces beneath each water-pipe. In order to have this stream touch both filtering-surfaces, the filtering-partitions are arranged comparatively closely together, if desired. The open spaces between the same need not be more than one-quarter of an inch wide. The pipes F are connected with a central supply-pipe, G, which extends through the filter-case, and is provided on the outside thereof with a suitable stop-cock for regulating the supply of water. The pipe G is connected with a pump, or an elevated reservoir, or other apparatus, which will supply the water under a suitable pressure—say about thirty pounds to the square inch. *h* represents the filter-cloth, enveloping each filtering-partition. It is preferably applied in the form of an endless apron slipped over each filtering-partition, so as to be closed at the top and bottom, while the joints at each side are rendered tight by strips of wood $i$, arranged between each pair of filtering-partitions, as shown in Fig. 5.

The saccharine solution to be filtered enters through the pipe $a$, and, passing downward between the filtering-partitions, the saccharine matter filters through the filtering-surfaces, and runs down in the grooves of the filtering-partitions, whence it is discharged in any common and well-known manner, while the solid and other impurities which do not settle on the bottom of the apparatus adhere to the filtering-surfaces and accumulate thereon. When this accumulation of impure matter has reached such an extent that the filtering-surfaces refuse to operate with the desired rapidity, the supply of saccharine solutions is cut off, and a gentle current of water admitted through the pipes F, whereby any saccharine matter contained in the matter accumulated on the filtering-surfaces is dissolved, and discharged through the pipes $e'$, the solution so obtained being returned to the receptacle containing the original saccharine solution. When the product so discharged is no longer of any value, the water is admitted through the pipe G with full force, causing a strong stream to pass down between each adjacent pair of filtering-surfaces, whereby the solid and other matter adhering thereto is rapidly and thoroughly detached therefrom, and carried off through the pipes $e'$. When the filtering-surfaces are completely cleaned, which is readily ascertained by the appearance of the current of water issuing from the pipes $e'$, the water is shut off from the pipes G F, and the discharge-pipes $e'$ closed, when the filter is again ready for operation.

By employing my improved means for cleaning filters the time heretofore consumed in taking apart and putting together the filter is saved, while the filtering-partitions are enabled to be arranged more closely together than when reciprocating or other mechanical scrapers are employed, thereby affording a greater filtering-surface in the same amount of space.

I claim as my invention—

1. The combination, with a filter provided with vertical filtering-partitions B, of the water-supply pipe G and horizontal branch pipes F, provided with openings or perforations on their under side, and arranged above the spaces between the filtering-partitions, substantially as and for the purpose hereinbefore set forth.

2. The combination, with the filtering-partitions B, of the endless filter-cloths $h$ and intermediate strips $i$, substantially as and for the purpose hereinbefore set forth.

HORACE WILLIAMS.

Witnesses:
 EDWARD WILHELM,
 CHARLES BUCHHEIT.